Patented Sept. 29, 1936

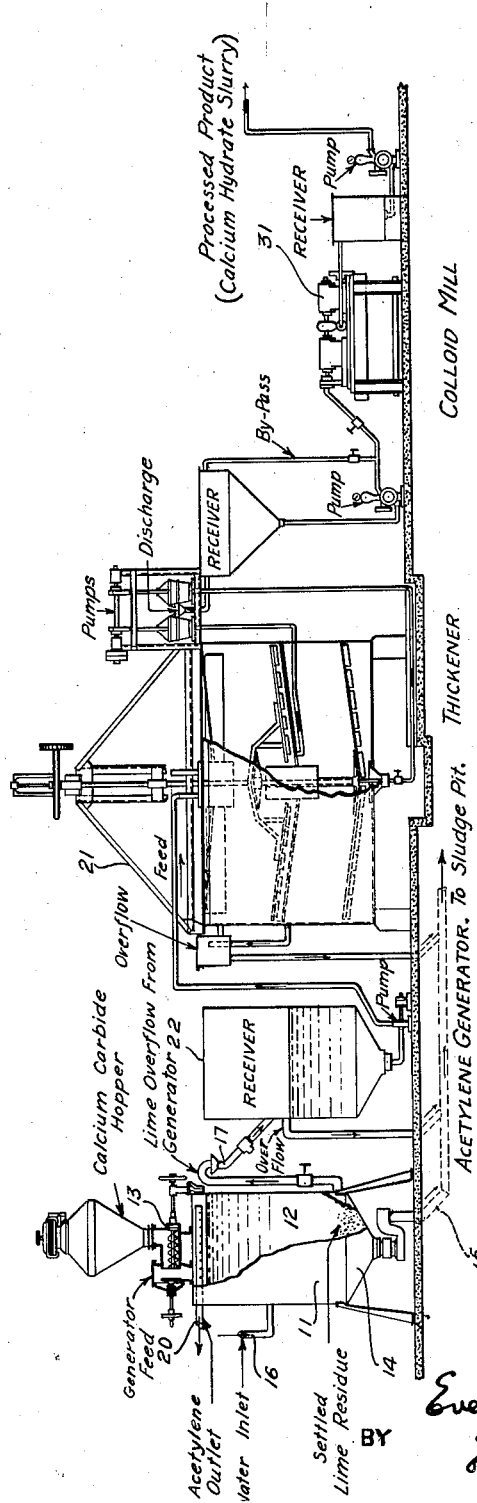

2,055,773

UNITED STATES PATENT OFFICE 2,055,773

LIME PRODUCT AND PROCESS OF MAKING THE SAME

Everett E. Radcliffe, Scarsdale, N. Y., assignor, by mesne assignments, to Union Carbide and Carbon Corporation, a corporation of New York Application June 16, 1932, Serial No. 617,513

3 Claims. (Cl. 23—186)

This invention relates to an improved lime preparation and process of making the same and especially to a process which utilizes the residue from the generation of acetylene from calcium carbide.

Calcium hydroxide, as a slaked lime, is widely used in various industries. For example, hydrated lime is used in the manufacture of sand-lime brick, in water purification, the manufacture of bleaching powder, calcium cyanamid and calcium nitrate, the purification of sugar, and in paper making. In some of these industries the lime is suspended in water and in such cases it is important that the lime should not congeal, settle out of the water, or cake, thereby clogging the apparatus. It is also important that the lime suspension should flow freely through pipes etc. without congealing or caking. In order to obtain a suspension of lime having these properties it has heretofore been necessary to employ so-called "soft burned lime". This lime is made by roasting the limestone for a relatively short time. In fact the period of burning is so short that all the limestone is not changed to lime. When this lime is slaked large cores are left. These cores are pieces of limestone, sometimes as large as 1 inch in diameter and often amount to 10% of the lime. After slaking, the product must be screened to remove these cores, thus involving an additional operation in addition to the loss caused by the presence of unutilized material.

In the preparation of acetylene, water is caused to react with calcium carbide thus generating acetylene gas and leaving slaked lime. This lime has not heretofore been considered suitable for use in the chemical industries and elsewhere because of its quick settling rate and its tendency to cake. Another objectionable feature of carbide residue is the fact that after standing for an appreciable time it congeals to such an extent that it is difficult to mix with other dry materials or dilute with water. The problem of the disposal of this residue has been a serious one in large acetylene plants. By my invention I have devised a means whereby the residue from the generation of acetylene gas from calcium carbide can be changed into a form adapted for use in the chemical industries and elsewhere where a suspension of lime in water is required.

An object of my invention is to produce a suspension of lime in water which shall be slow settling, non-congealing and non-caking and in which it shall not be necessary to use soft burned lime. Another object of my invention is to provide a means for rendering the residue from acetylene generators useful in the chemical industries. These and other objects of my invention will be evident from the following specification having reference to the accompanying drawing in which the single figure is a diagrammatic representation of a plant for carrying out a process illustrating one embodiment of my invention.

Various types of acetylene generators are in use. In the drawing I show an acetylene generator 11 of the carbide-to-water type. In this generator the carbide is fed into a chamber 12 containing water. The carbide is fed at a constant rate by means of any suitable feeding means such as the one shown at 13. The bottom of the chamber 12 is made conical in form, as at 14, forming a receptacle for the settled lime residue. This residue is periodically removed by means of a connection 15 and may be discarded. Water is fed into the chamber 12 through an inlet 16. In order to maintain a constant temperature in the generating chamber during the operating period additional water must be introduced into the generating chamber and the amount of the water so introduced is carefully regulated. In order to maintain a constant level of water in the generating chamber during the operation of the generating chamber an overflow 17 is provided. The acetylene passes out through an outlet 20.

Calcium carbide being an electric furnace product, the resultant calcium carbide residue contains greater percentages of certain impurities, such as ferro silicon, alumina, and the like, than are found in the better commercial limes. These metallic impurities, due to their specific gravity, naturally settle first. Consequently the calcium carbide residue which settles in the cone 14 contains varying quantities of these non-lime impurities. The overflow water discharged through the overflow 17 contains a large quantity of lime. The amount of lime contained in this overflow water is practically constant at all times during its operation and the percentage of non-lime impurities found in the overflow is not only more constant in quantity, but is actually less, than in the residue which collects at the bottom of the generating chamber. Thus it is evident that the acetylene generator acts as a classifier. By using only the lime from the overflow it is possible to obtain a product which will meet the specifications for ordinary commercial slaked lime. I have found that during commercial operation in a large acetylene plant the non-lime impurities amount to less than 4%.

The overflow contains an excessive amount of water, for example, 73% of free water. In order to treat this slurry economically it is desirable to reduce the percentage of water as low as possible while leaving the slurry free flowing. I have found it desirable to reduce the water to between 60 and 50%. This may be done by storing the overflow which permits the removal of the excess water by seepage or decanting operation; I prefer to use a thickener, as at 21. Since the thickener operates best when fed at a uniform rate I prefer to employ a receiver 22 between the overflow of the acetylene generator and the thickener.

After the residue has had its non-lime impurities reduced and restricted to constant quantities through the use of an overflow and its moisture content reduced to desired and constant limitations through the employment of a thickener, the remaining slurry is withdrawn from the thickeners by a pump and delivered to a grinder 31 where the solids are ground, disintegrated, pulverized, or reduced in particle size. This may be done by means of a ball mill, hammer mill, homogenizer, and/or any other type of disintegrating, pulverizing, grinding or emulsifying equipment, but the preferred method of carrying out this grinding operation is by using a colloid mill. The grinding should be such that the particle size of the resultant slurry is finer than that of ordinary commercial hydrated lime the majority of which usually will not pass through a screen having more than 200 meshes to the inch. In my process, the grinding is such that the particle size of the solids in the slurry is much finer depending upon the physical and chemical characteristics desired. For example, I have found a slurry which will pass through a screen having 350 meshes to the inch, sufficiently slow settling for many chemical operations. The resultant slurry, I have found, does not have the compacting and caking characteristics of ordinary calcium carbide residue nor does it have the fast settling qualities and congealing properties of said residue. Due to the change in characteristics, the processed calcium carbide residue can be stored, transported, handled and used similarly to the lime suspensions formed from "soft burned" lime.

While I have described my invention as applied to the treatment of calcium carbide residue I have found that slaked lime formed from ordinary quick limes is improved by milling or grinding. Even the product of "soft burned" lime is in many instances improved to some degree by grinding. The method employed in this case would be briefly as follows: A commercial quick lime is hydrated by the addition of water, sufficient water being added to not only completely slack the lime, but also to make a pumpable slurry. This slurry is then pumped to a grinder where the particle size is reduced and a product having uniform, slow-settling, non-caking and non-congealing characteristics is obtained.

In certain industries, especially the sugar refining industry, it is very important that the lime used shall have uniform physical and chemical properties. It is difficult to secure this uniformity due to the fact that the lime is burned in kilns and the product varies according to the nature of the fuel as well as the weather at the time the lime is burned. Other circumstances may also make difficult the securing of uniformity in the quick lime. Also the slaking may be under different conditions and this may also make the hydrated lime less uniform. In order to compensate for this lack of uniformity of the hydrated lime it must be tested and the process modified, thereby involving difficulties. In the preparation of hydrated lime from carbide residues uniformity is easily secured. The carbide is formed in an electric furnace where atmospheric conditions have a negligible effect. The reaction with water takes place in the presence of excess water and uniformity is secured in this respect. The resultant product is passed through a thickener giving a uniform concentration of hydrate and is then ground to uniform size. Thus it will be seen that my process produces a product having uniform properties.

While I have shown a device in which the settled residue is discarded this is not necessary when lime of a purity comparable with commercial lime is not required. In case it is desired to use this settled residue it would in general be desirable to screen the residue before passing it through the thickener.

I have found that the suspension of lime which has been processed in a colloid mill is slow settling, non-congealing and non-caking. Even after standing for a period of months it can be pumped through pipe lines, shipped in tank cars and passed through towers containing baffle plates without caking or otherwise clogging the apparatus.

While I have described one type of apparatus suitable for carrying out my invention, it is evident that this is only representative of many similar types which could be employed and I do not limit myself to any particular form of apparatus. For example I could grind the slurry before passing it through the thickener or otherwise alter the sequence of operations.

I claim:

1. Method of rendering the residue of a calcium carbide-water acetylene generator suitable for use in the chemical industry, which comprises removing a portion of the residue in the overflow, thickening said overflow liquid containing hydrated lime, so that it is barely free flowing and grinding said thickened liquid.

2. Method of treating the overflow liquid from a calcium carbide-water acetylene generator, which comprises thickening said overflow liquid and grinding the solids in said thickened liquid to a fineness such that the resultant liquid is slow-settling, non-congealing and non-caking.

3. Method of preparing the hydrated lime preparation suitable for use in the chemical industry from the residue of a carbide-to-water type acetylene generator provided with an overflow which comprises removing a portion of the hydrated lime formed in said generator through said overflow, removing a portion of the water from said overflow liquid and grinding the thickened liquid in a colloid mill to such a fineness that it will pass through a screen having about 350 meshes to the inch.

EVERETT E. RADCLIFFE.